(12) United States Patent
Quesada Barbero

(10) Patent No.: US 11,376,756 B2
(45) Date of Patent: Jul. 5, 2022

(54) COOLING DEVICE FOR DISC CUTTERS

(71) Applicant: Germans Boada, S.A., Rubi (ES)

(72) Inventor: Juan Antonio Quesada Barbero, Rubi (ES)

(73) Assignee: GERMANS BOADA, S.A., Rubi (ES)

( * ) Notice: Subject to any disclaimer, the term of this patent is extended or adjusted under 35 U.S.C. 154(b) by 0 days.

(21) Appl. No.: 17/107,451

(22) Filed: Nov. 30, 2020

(65) Prior Publication Data

US 2021/0252731 A1  Aug. 19, 2021

(30) Foreign Application Priority Data

Dec. 17, 2019  (ES) ................ ES201931113

(51) Int. Cl.
*B26D 7/08* (2006.01)
*B26B 25/00* (2006.01)
*B26B 29/00* (2006.01)

(52) U.S. Cl.
CPC .............. *B26D 7/08* (2013.01); *B26B 25/005* (2013.01); *B26B 29/00* (2013.01)

(58) Field of Classification Search
CPC ........ B23D 59/02; B23D 59/025; B26D 7/08; B26B 25/005; B26B 29/00; B27G 19/02; B28D 7/02; B23Q 11/10; B23Q 11/06; B23Q 11/08; B23Q 11/0858; Y10T 83/293; Y10T 83/283; B24B 55/045; B24B 55/02; B24B 55/03; B23B 27/12; B23C 5/28
See application file for complete search history.

(56) References Cited

U.S. PATENT DOCUMENTS

| | | | | |
|---|---|---|---|---|
| 385,666 A | | 7/1888 | Hadley | |
| 992,490 A | * | 5/1911 | Fergusson | B23D 59/02 83/169 |
| 3,256,647 A | * | 6/1966 | Hutton | B24B 55/02 451/450 |
| 3,661,045 A | * | 5/1972 | Mermelstein | B23D 47/005 83/676 |
| 3,848,929 A | * | 11/1974 | Miller | B23D 59/02 299/39.4 |
| 4,153,973 A | * | 5/1979 | Hughes | A22B 5/205 452/160 |
| 4,414,783 A | * | 11/1983 | Vincent | B23D 59/02 29/DIG. 86 |

(Continued)

FOREIGN PATENT DOCUMENTS

ES  2630366  8/2017

*Primary Examiner* — Jonathan G Riley
(74) *Attorney, Agent, or Firm* — Hodgson Russ LLP

(57) ABSTRACT

The present invention relates to a cooling device for disc cutters, which can include: a curved, tubular guide (6), with a radius of curvature slightly greater than the cutter disc and concentric with the periphery of the disc (2); a curved cannula (4), made of semi-rigid material, mounted inside the curved guide capable of longitudinal movement between two end positions, connected to a tube (3) for supplying coolant to a nozzle (5); and means for attaching the cannula (4) in any position comprised between the two end positions of movement with respect to the curved guide. The nozzle (5) moves over a lower sector (21) of the periphery of the disc, and during the cutting of parts (P) of different thicknesses, said nozzle (5) is located at different heights and facing the disc (2) contact and penetration area in the part (P) to be cut.

4 Claims, 4 Drawing Sheets

(56) References Cited

U.S. PATENT DOCUMENTS

| | | | | |
|---|---|---|---|---|
| 4,619,081 | A * | 10/1986 | Li | B23Q 11/005 |
| | | | | 451/450 |
| 5,461,008 | A * | 10/1995 | Sutherland | B08B 17/00 |
| | | | | 438/460 |
| 5,826,478 | A * | 10/1998 | Zerrer | B05B 15/16 |
| | | | | 83/169 |
| 8,347,871 | B2 * | 1/2013 | Irvine | B28D 7/02 |
| | | | | 125/13.01 |
| 8,858,303 | B2 * | 10/2014 | Salomon | B24B 55/045 |
| | | | | 451/451 |
| 2004/0042908 | A1 * | 3/2004 | Donnerdal | B24B 27/08 |
| | | | | 417/229 |
| 2006/0213341 | A1 * | 9/2006 | Hogan | B23D 45/048 |
| | | | | 83/13 |
| 2006/0240753 | A1 * | 10/2006 | Ziegs | B24B 27/08 |
| | | | | 451/449 |
| 2009/0235792 | A1 * | 9/2009 | Tsung | B28D 7/02 |
| | | | | 83/169 |
| 2012/0312138 | A1 * | 12/2012 | Salomon | B24B 27/08 |
| | | | | 83/169 |

* cited by examiner

COOLING DEVICE FOR DISC CUTTERS

CROSS REFERENCE TO RELATED APPLICATION(S)

This application claims priority to Spanish Patent Application No. 201931113, filed Dec. 17, 2019, the entire disclosure of which is incorporated herein by reference.

TECHNICAL FIELD

This invention relates to a cooling device applicable to cutters that have a disc for cutting materials, for example building materials.

BACKGROUND

Disc cutters that have a device for cooling the disc, in order to prevent the deterioration thereof due to overheating and to extend the useful life of the disc, are currently known on the market.

U.S. Pat. No. 385,666 describes a machine provided with a protective cover for a cutter disc and with two tubes for supplying coolant to the disc, connected by means of a key to a single feed tube, and which enable the coolant to be supplied on the upper half of the cutter disc.

In this type of machine, the supply of coolant on the upper area or half of the cutter disc has a relatively low effectiveness, since the high rotational speed of the disc causes the coolant to be thrown tangentially practically immediately, minimising the capacity for cooling the disc.

Invention patent ES 2 630 366 B1, of the same holder of the present invention, describes a protective cover with cooling for cutter discs. Said protective cover defines a cavity, generally semi-cylindrical, which comprises fastening means inside a tube and a nozzle for supplying coolant at different heights on the upper half of the cutter disc.

Said protective cover with cooling for cutter discs uses a single tube for supplying coolant, which is an advantage over U.S. Pat. No. 385,666 by simplifying the construction thereof; further exhibiting the particularity that the lateral walls of the cover comprise fins internally, the purpose of which is to redirect the coolant that is thrown tangentially against the perimeter wall of the cover due to the rapid rotational movement of the disc towards the lateral faces of the disc.

This background ES 2 630 366 B1 provides clear advantages of use with respect to the aforementioned background U.S. Pat. No. 385,666, although the cooling capacity of the disc is also limited by the projection of coolant on the upper area of the disc, either by means of the nozzle or by means of the fins defined on the lateral walls of the cover.

Therefore, the technical problem that arises is the development of a cooling device that enables the cooling capacity of the disc to be increased, applying the coolant in the area of the disc where the heating thereof originates, and that does not require fins to be defined on the lateral walls of the protective cover of the disc for redirecting the coolant projected tangentially by the rotational movement of the disc towards the disc.

SUMMARY

The cooling device for disc cutters, object of the present invention, is of the type described in the preamble of claim 1 and provided with a protective cover that covers approximately the upper half of the disc and which comprises: a tube for supplying coolant and a nozzle that pours the coolant on the disc.

An objective of the invention is to cool the disc by means of tangential pouring of the coolant on a lower sector of the disc and specifically in the area where the heating thereof takes place, i.e., in the disc contact and penetration area in the part to be cut.

Another objective of the invention is to ensure that the nozzle maintains a constant separation with respect to the periphery of the disc when said nozzle moves away from the cover, towards the lower cantilevered area, to approach the cutting area of the part.

For this, and according to the invention, this device comprises:
- a curved, tubular guide, with a radius of curvature slightly greater than the cutter disc, attached inside the cover and concentric with the periphery of the disc;
- a curved cannula, made of semi-rigid material, mounted inside the curved guide capable of longitudinal movement between two end positions and provided with an upper end connected to the tube for supplying coolant and a lower end that protrudes to a greater or lesser extent, cantilevered, below the cover;
- means for attaching a cannula in any position comprised between the two end positions of movement, said cannula projecting the coolant in a direction tangential to the rotation of the disc.
- wherein the nozzle for supplying coolant is coupled to the lower end of the cannula and can be moved over a lower sector of the periphery of the disc, located below the cover, said nozzle being attached during the cutting of parts of different thicknesses in a disc contact and penetration area in said part.

By means of the movement of the curved cannula, made of semi-rigid material, over the curved guide, it is ensured that the lower end of said cannula and the nozzle coupled thereto can approach the cutting area of the part, maintaining the appropriate position and separation with respect to the disc, for dispensing the coolant in a tangential direction in the disc cutting and penetration area.

According to the invention, the means for attaching the cannula at different points of the path thereof comprise a fastening clip attached to said cannula and it passes to the outside of the cannula through a groove that affects at least one section of the curved guide and the outer surface of the cover.

The cover exhibits a series of reliefs along said groove for coupling the fastening clip and holding the cannula at different points of the path thereof.

The arrangement of said clip on the cover enables the user to comfortably and easily adjust the position of the nozzle to bring it closer to the cutting area, even during the cutting operation, without approaching the disc and therefore without risk of accidents.

An additional advantage, derived from the ease and comfort of actuation of these attachment means, is that the cannula can be initially arranged in the highest position so that the nozzle does not pose a visual obstruction when the cutting begins and then bring it closer to the cutting area to improve disc cooling.

However, it should be mentioned that the means for attaching the cannula in different positions can be of any other suitable type and equivalent to those mentioned above.

Another objective of the invention is to ensure that the pouring of coolant is carried out in the indicated area and simultaneously on the two opposite faces and on the periphery of the perimeter portion of the disc, thus ensuring a uniform and highly efficient cooling of the disc.

To do this, a nozzle that exhibits a specific configuration has been designed, said nozzle comprising an upper mouth, coupled to the tube for supplying coolant, a visor for pouring coolant facing the inside of the disc and which has a cut shaping a passage area of a perimeter portion of the disc at the end thereof, said visor simultaneously pouring coolant on the two opposite faces and on the periphery of said perimeter portion of the disc.

With the features indicated above, it is achieved, on the one hand, that the disc is cooled specifically in the area where the heating of the disc is produced, i.e., in the disc contact and penetration area in the part to be cut and, on the other hand, that the coolant causes uniform cooling of said contact area by being simultaneously applied on the two opposite faces and on the peripheral edge of said area of the disc.

BRIEF DESCRIPTION OF THE DRAWINGS

As a complement to the description being made, and for the purpose of helping to make the features of the invention more readily understandable, this specification is accompanied by a set of drawings which, by way of illustration and not limitation, represent the following.

DETAILED DESCRIPTION

Figure 1:
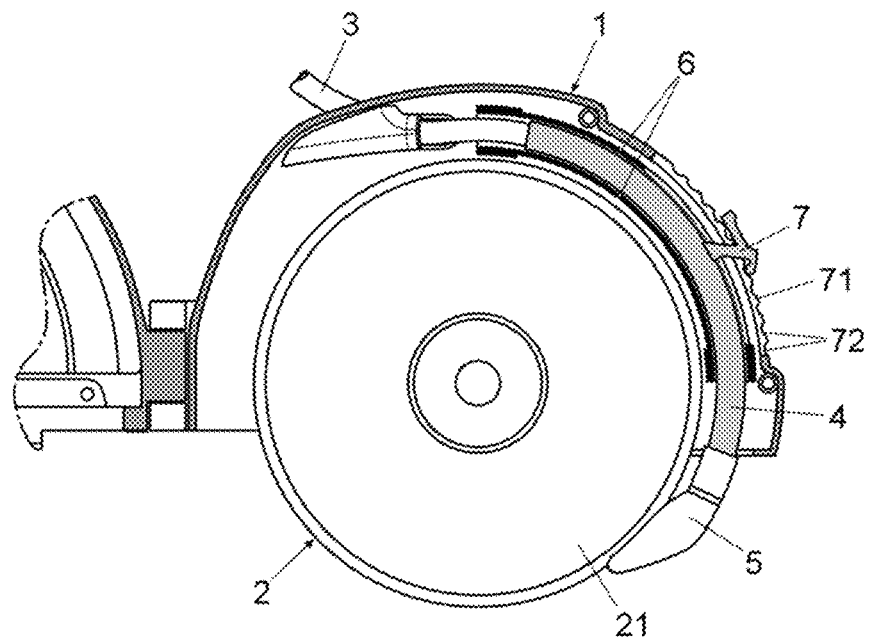
FIG. 1 shows a partial elevation view of the cooling device for disc cutters according to the invention, wherein the protective cover of the disc has been partially represented and in an open position to enable the cannula connected to the coolant dispenser tube and the nozzle in an intermediate position of the path thereof on a lower sector of the cutter disc to be seen.
Figure 2:
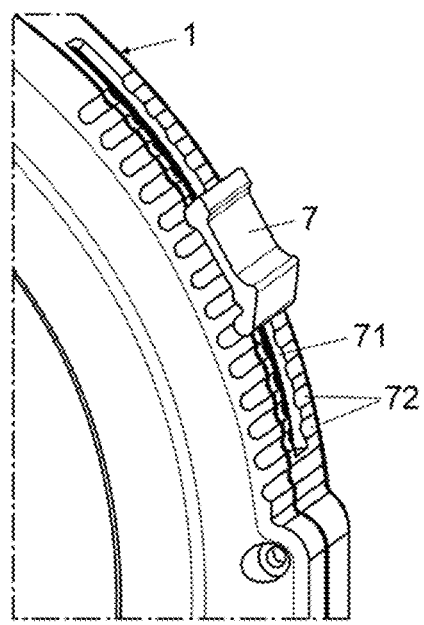
FIG. 2 shows a partial perspective view of the cutter, wherein the means for attaching the cannula in different positions are observed.

FIG. 1 shows a disc cutter provided with a protective cover (1) which covers approximately the upper half of the cutting disc (2).

The cooling device comprises a tube (3) for supplying coolant, a cannula (4) and a nozzle (5) that pours the coolant on the periphery of the disc (2);

The cannula (4) is mounted and capable of longitudinal movement in a curved, tubular guide (6), which has a radius of curvature slightly greater than the cutter disc and which is attached inside the cover (1) and concentric with the periphery of the disc (2).

The cannula (4) is made of a semi-rigid material and has a curvature according to the curved guide, so that when said cannula moves towards the lower area, the end carrying the nozzle protrudes in a cantilever below the cover, ensuring that the nozzle describes a path parallel to the contour of the disc (2).

The device comprises means for attaching the cannula (4) at different points of the path thereof along the curved guide (6) and consequently for attaching the nozzle (5) on different points of a lower sector (21) of the periphery of the disc.

Figure 3:
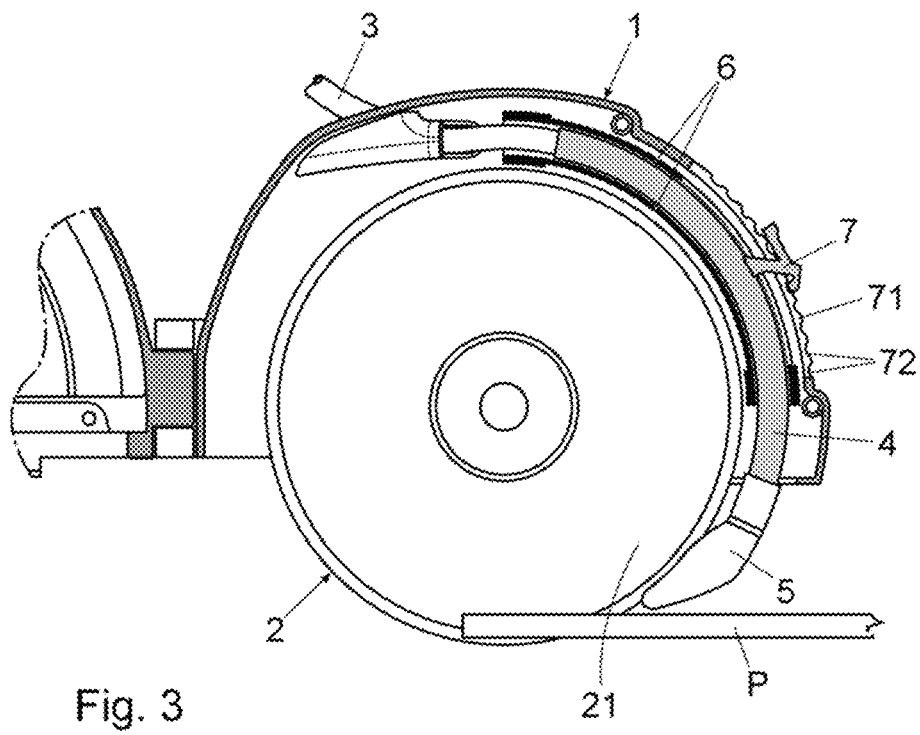
FIGS. 3 and 4 show respective elevation views of the cutter during the cutting of parts of different thickness with the dispensing nozzle located on the disc contact and penetration area in said parts.
Figure 4:
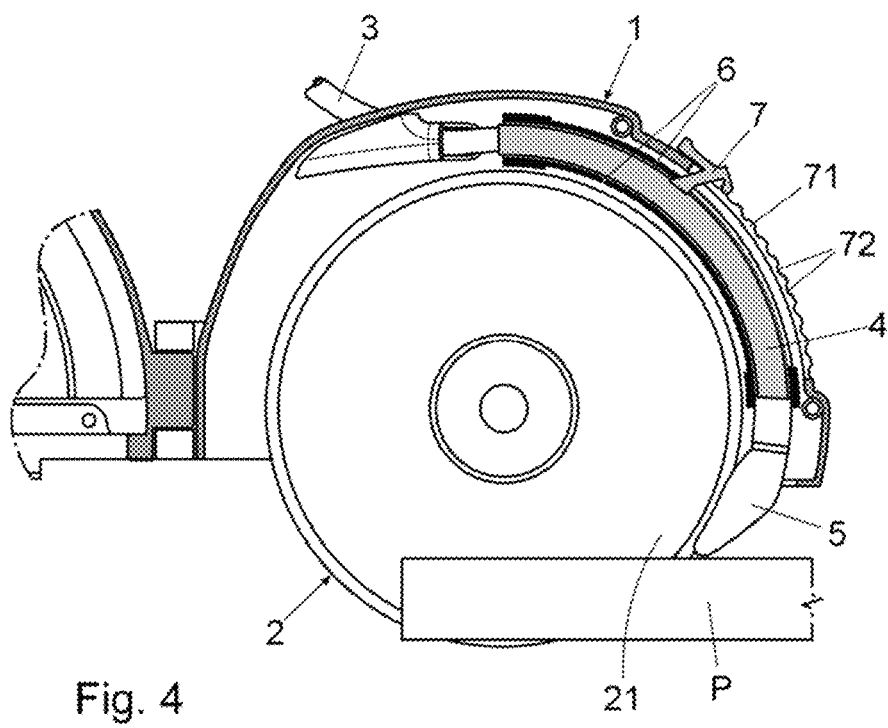

In the embodiment shown in FIGS. 1, 3 and 4, the means for attaching the cannula (4) (e.g. a fastening device) comprises a fastening clip (7) attached to said cannula (4) and which protrudes through a groove (71) that affects at least one section of the curved guide (6) and of the cover (1).

On the outside of the protective cover (1), along the groove (71) of the cover, there are a series of reliefs (72) for coupling the fastening clip (7) and holding the cannula (4) in different positions.

As shown in FIGS. 3 and 4, during the cutting of parts (P) of different thicknesses, the means for attaching the cannula (4) enable the nozzle (5) to be located at different heights, and in a position facing the disc (2) contact and penetration area in the part (P) to be cut, ensuring proper cooling.

Figure 5:
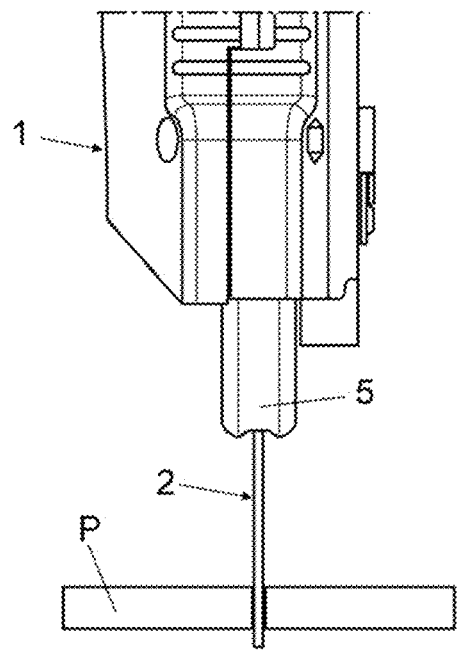
FIGS. 5 and 6 show respective partial views of the cutter seen from the front with the nozzle located in an upper position at the beginning of the cutting of a part, enabling the cutting area to be visualised, and in a lower position during the cutting of said part.
Figure 6:
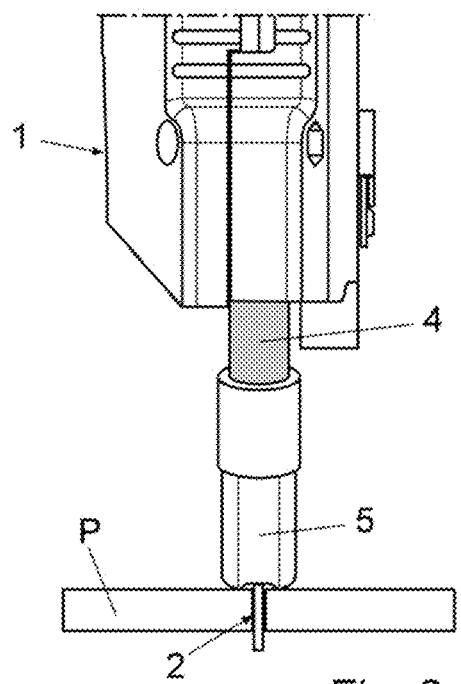

As shown in FIGS. 5 and 6, the means for attaching the cannula enable the nozzle (5) to be located in an upper position, close to the cover, at the beginning of the cutting of a part, so that said nozzle does not pose an obstruction and enables the cutting area to be visualised; and in a lower position during the cutting of said part, ensuring the effective cooling of the disc cutting area.

Figure 7:
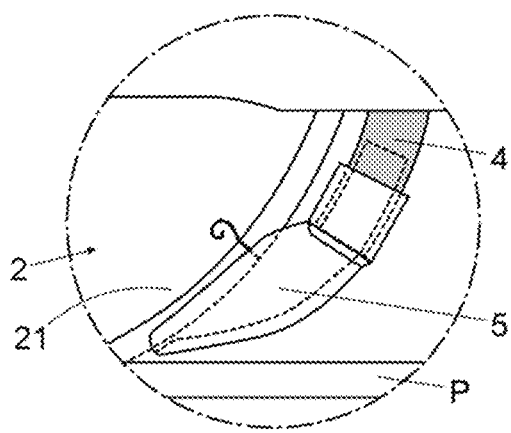
FIGS. 7 and 8 show two elevation views of two interchangeable nozzles coupled to the movable cannula.
Figure 8:
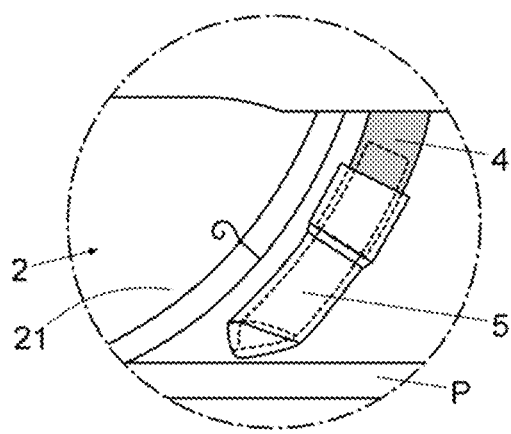

As shown in FIGS. 7 and 8, the nozzle (5) is interchangeable and can exhibit different configurations, suitable for projecting the coolant tangentially to the rotation of the disc, and always in the disc cutting area.

Figure 9:
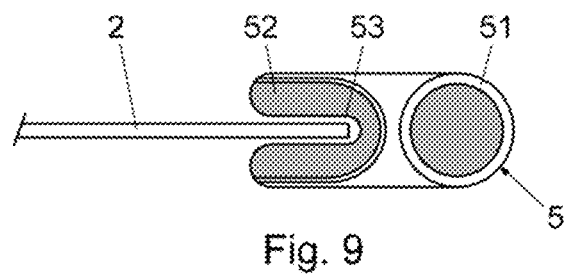
FIG. 9 shows an upper plan detail view of an exemplary embodiment of the nozzle and the relative position thereof with respect to the periphery of the cutter disc.

As shown in FIG. 9, the nozzle shown in FIG. 5 has a specific configuration for projecting the coolant tangentially on the disc (2) cutting area.

Said nozzle (5) comprises an upper mouth (51) for coupling thereof to the cannula (4) for supplying coolant, said nozzle (5) extending towards the lower area into a visor (52) for pouring coolant, facing the inside of the disc (2) and which has a cut (53) shaping a passage area of a perimeter portion of the disc (2) at the end thereof, said visor (52) simultaneously pouring coolant on the two opposite faces and on the periphery of said perimeter portion of the disc (2).

Having sufficiently described the nature of the invention, in addition to a preferred exemplary embodiment, it is hereby stated for the relevant purposes that the materials, shape, size and layout of the described elements may be modified, provided that it does not imply altering the essential features of the invention claimed below.

What is claimed is:

1. A cooling device for disc cutters with a protective cover which covers approximately an upper half of a cutter disc, said cooling device comprising:
   a tube configured to supply coolant and a nozzle configured to pour coolant on the cutter disc;
   a curved, tubular guide having a radius of curvature greater than the cutter disc, the curved, tubular guide attached inside the protective cover and concentric with a periphery of the cutter disc;
   a curved cannula made of semi-rigid material, and mounted inside the curved guide capable of longitudinal movement between two end positions and provided with an upper end connected to the tube for supplying coolant and a lower end which protrudes below the protective cover and wherein the nozzle is coupled; and
   a fastening device configured to attach the curved cannula at different points of a path thereof, such that during the movement of the curved cannula, the nozzle moves over a lower sector of the periphery of the cutter disc;

wherein the fastening device comprises a fastening clip attached to the cannula and which protrudes through a groove that passes through at least one section of the curved guide and passes through an outer surface of the protective cover;

wherein the fastening device enables, during cutting of parts of different thicknesses, the nozzle to be located at different heights and facing a contact and penetration area of a part to be cut.

2. The cooling device according to claim 1, further comprising a series of reliefs along the groove of the protective cover for coupling the fastening clip and holding the curved cannula in different positions.

3. The device according to claim 1, wherein the nozzle comprises:
an upper mouth configured to couple to the curved cannula for supplying coolant, the upper mouth extending towards a lower area into a visor for pouring coolant facing inside of the cutter disc; and
a cut shaping a passage area of a perimeter portion of the cutter disc at the end thereof;
wherein the visor is configured to simultaneously pour coolant on two opposite faces and on a periphery of the perimeter portion of the cutter disc.

4. The device according to claim 2, wherein the nozzle comprises:
an upper mouth configured to couple to the curved cannula for supplying coolant, the upper mouth extending towards a lower area into a visor for pouring coolant facing inside of the cutter disc; and
a cut shaping a passage area of a perimeter portion of the cutter disc at the end thereof;
wherein the visor is configured to simultaneously pour coolant on two opposite faces and on a periphery of the perimeter portion of the cutter disc.

* * * * *